United States Patent
Iwasaki et al.

(10) Patent No.: US 6,793,320 B2
(45) Date of Patent: Sep. 21, 2004

(54) PRINTING APPARATUS AND PRINTING METHOD

(75) Inventors: Osamu Iwasaki, Tokyo (JP); Naoji Otsuka, Kanagawa (JP); Kiichiro Takahashi, Kanagawa (JP); Minoru Teshigawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,559

(22) Filed: Oct. 25, 2001

(65) Prior Publication Data

US 2002/0057308 A1 May 16, 2002

(30) Foreign Application Priority Data

Nov. 1, 2000 (JP) ........................................ 2000-335179

(51) Int. Cl.[7] .............................. B41J 2/15; B41J 2/145
(52) U.S. Cl. .............................. 347/41; 347/40; 347/19
(58) Field of Search ............................ 347/12, 41, 16, 347/19, 43, 40; 358/21

(56) References Cited

U.S. PATENT DOCUMENTS

| | | | | |
|---|---|---|---|---|
| 5,625,389 A | * | 4/1997 | Eriksen et al. | 347/41 |
| 6,007,181 A | | 12/1999 | Takahashi et al. | 347/41 |
| 6,102,511 A | | 8/2000 | Shioya | 347/9 |
| 6,168,320 B1 | * | 1/2001 | Ono et al. | 395/102 |

* cited by examiner

*Primary Examiner*—Hai Pham
*Assistant Examiner*—Lam Nguyen
(74) *Attorney, Agent, or Firm*—Fitzpatrick, Cella, Harper & Scinto

(57) ABSTRACT

A complete image is obtained by performing printing scan for M times (M is an integral number: $M \geq 1$) using N printing elements (N is an integral number: $N \geq 2$) on the same printing area of in a front side of the printing medium in the direction of transporting the printing medium. On the other hand, a complete image is also obtained by performing printing scan for K times (K is an integral number: $K > M$) using L printing elements (L is an integral number: $L \leq N$) on the same printing area in rear side of the printing medium in the direction of transporting the printing medium.

16 Claims, 15 Drawing Sheets

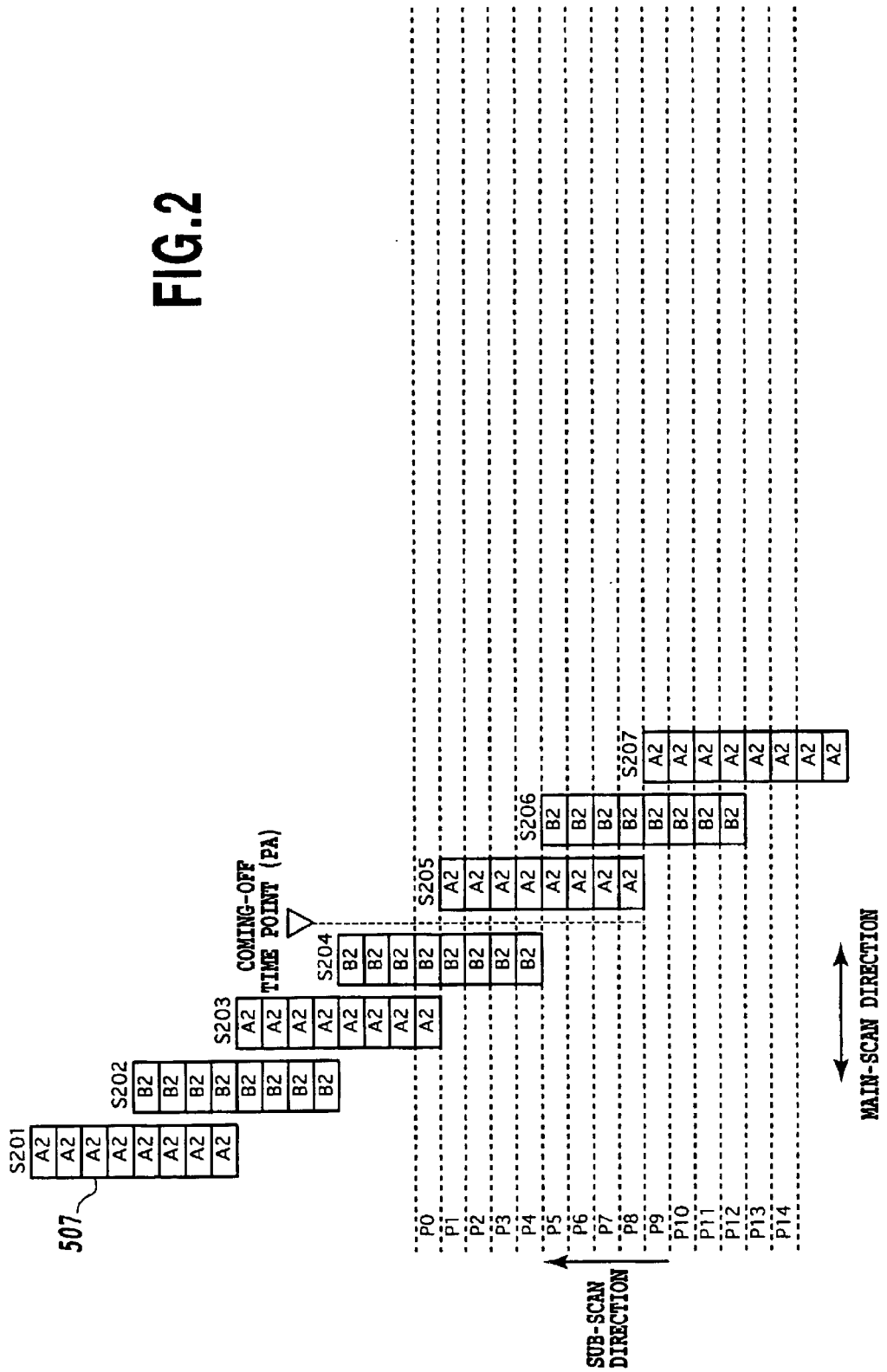

PRINTING APPARATUS AND PRINTING METHOD

This application is based on Patent Application No. 2000-335179 filed Nov. 1, 2000 in Japan, the content of which is incorporated hereinto by reference.

BACKGROUND OF THE INVENTION

1. Field of the Invention

The present invention relates to an ink jet printing method and apparatus on a multi-path printing system in which a desired image is formed completely on a printing medium by a plurality of scanning movements of a printing head on the same printing area of the printing medium.

2. Description of the Related Art

FIGS. 1A, 1B, and 1C are schematic diagrams that illustrate a transport stage for transporting a printing medium in a typical serial type printing apparatus.

In those figures, the reference numeral 509 denotes a printing medium (e.g., a sheet of paper or a plastic sheet). The printing medium 509 can be fed in a sub-scan direction from the right side to the left side as indicated by the arrow in each figure. In other words, the printing medium 508 receives the sheet-feed force when it is sandwiched between the transport roller 501 and the pinch roller 503. The transport roller 501 can be driven by a sheet-feed motor (not shown). The pinch roller 502 is pressed against that transport roller 501 by the spring pressure, so that it can be rotated together with the transport roller 501. The sheet-ejection rollers 503, 504 are also arranged as a two-stage sheet-ejection roller so that they work together with the transport roller 501. In addition, sheet-ejection spurs 505, 506 are pressed against the rollers 503, 504 by the spring pressures, respectively.

The feed amount of the printing medium 508 (the amount by which, or rate at which, it is fed) due to the rotational movements of the sheet-ejection rollers 503, 504 is adjusted to about 100.3% of the feed amount of the printing medium 508 due to the rotational movement of the transport roller 501 because the printing medium swells due to the application of ink upon printing in an ink jet printing system. If the feed amount of the printing medium 508 defined by the sheet-ejection rollers 503, 504 were set to the same level as that due to the transport roller 501, the swell amount of the printing medium 508 would accumulate, causing a failed sheet-feed between these rollers.

In the sheet-feed stage shown in FIG. 1A, the printing medium 508 becomes caught between the rollers using the upper portions of the sheet-ejection rollers 503, 504, and the transport roller 501, respectively. If the printing medium 508 did not swell under the condition shown in FIG. 1A, the printing medium 508 would slip over the contacted surfaces of the respective sheet-ejection rollers 503, 504. In this case, therefore, the feed amount of the printing medium 508 could depend on the transport thereof by the transport roller 501.

Furthermore, the reference numeral 507 denotes a printing head that performs a printing scan in the direction perpendicular to the plane of each of FIGS. 1A, 1B, and 1C (i.e., main-scan direction). The reference numeral 509 denotes a printing area of the printing medium 508 to be printed by the printing head 507.

FIG. 1A illustrates the state in which two distinctive sheet-feed forces are being applied on the printing medium 508 by the transport roller 501 and sheet-ejection rollers 503, 504, respectively. FIG. 1B illustrates a moment when the rear end of the printing medium 508 has left the space between the pinch roller 502 and the transport roller 501. FIG. 1C illustrates the state in which the sheet-feed force is being applied to the printing medium 508 only by the sheet-ejection rollers 503, 504.

Referring now to FIG. 2, a two-path printing system will be described as an example of the conventional multi-path printing system, in which image formation is completed by moving the printing head 507 through two scans in forming each pixel.

The printing head 507 in FIG. 2 relatively moves towards the bottom of the figure with respect to the printing medium 508, which is intermittently transported in the sub-scan direction. As the present example is the two-path printing system, as those of the steps S201 to S207 (shown as successive head positions in FIG. 2.), the position of the printing head 507 in the sub-scan direction relatively deviates downward by one-half of a printing element width in the sub-scan direction. An image can be formed on each of the printing areas P0 to P14 on the printing medium 508 by two printing scans of the printing head 507. In the figure, "A2" denotes a mask that allows 50% of image data to remain. "B2" denotes a mask that interpolates the image data that mask A2 excludes.

The images are formed on the printing medium 508 one after another by alternately repeating: the printing scan of the printing head 507 on the basis of image data thinned out by alternately using the masks A2 and B2; and the transport of the printing medium 508 in the sub-scan direction by shifting it by one-half of the printing element width of the printing head 507. More specifically, in the step S201, the printing scan is performed on the basis of the image data thinned out using the mask A2, and thereafter, the printing medium 508 is fed in the sub-scan direction by one-half of the printing element width. Subsequently, in the step S202, the printing scan is performed on the basis of image data thinned out using the mask B2, and thereafter, the printing medium 508 is fed in the sub-scan direction by one-half of the printing element width. Thereafter, the same procedure is successively repeated to form images on the printing medium 508 in succession.

In the multi-path printing system of FIG. 2, for example, the following description relates to a period at step S204, which corresponds to the state shown in FIG. 1A and a period at step S205, which corresponds to the state shown in FIG. 1B. In this case, during the transport of the printing medium 508 from S204 to S205, the rear end of the printing medium 508 moves through a point PA between the steps S204 and S205, where it emerges from the grip of the pinch roller 502 (i.e., comes into the state shown in FIG. 1B).

The printing head 507 may be an ink jet print head having a plurality of printing elements that eject ink from their nozzles. In this example, the number of nozzles is 256 with 1200-dot/inch resolution. In this case, it is possible to form ink dots uniformly on the printing medium 508 as shown in FIG. 3 under the condition at step S204, which corresponds to the state shown in FIG. 1A. In the state of FIG. 1A, the printing medium 508 may be intermittently fed in the sub-scan direction to distances of about 2700 $\mu$m, that correspond to 128 nozzles. In the period at S205, which corresponds to the state shown in FIG. 1C, the feed amount of the printing medium 508 may be about 2708 $\mu$m, corresponding to about 100.3% of about 2700 $\mu$m. As a result, as shown in FIG. 4, each of the positions on which ink dots have been formed deviates by about 8 $\mu$m from its ideal position in the sub-scan direction, where that deviation corresponds to the difference between the feed amounts of the printing medium 508 obtained at the states shown in FIG. 1A and FIG. 1C. Furthermore, if the printing medium 508 is shifted from the state of FIG. 1A to the state of FIG. 1C through the state of FIG. 1B, the feed amount of the printing medium 508 may be further increased by about 8 μm in addition to the mentioned difference in feed amount of 8 μm. Because it is conceivable that the difference between the feed amounts of the sheet-ejection rollers 503, 504 and the transport roller 501 cannot be substantially removed by the slippage of the sheet-ejection rollers 503, 504, the stresses stored in the printing medium 508 and the sheet-ejection rollers 503, 504 are released at the instant when the printing medium 508 comes off the pinch roller 502. In other words, when the printing medium 508 is shifted to the state of FIG. 1C through that of FIG. 1B, a distance of about 8 μm, corresponding to the difference between the feed amounts of the sheet-ejection rollers 503, 504 and the transport roller 501 is added to another distance of about 8 μm that results from detachment of the printing medium 508 from the pinch roller 502. As a result, as shown in FIG. 5, the ink-dot-forming position is displaced from the ideal ink-spotting position by up to a maximum of the sum of those two amounts (i.e., about 16 μm in total).

The printing density, i.e., the number of ink dots which can be formed per unit area of the printing medium 508, in each of FIGS. 3, 4, and 5 shows a correlation with the coverage of ink on the printing medium 508, which is given by the following expression: [Printing density in FIG. 3]> [Printing density in FIG. 4]>[Printing density in FIG. 5].

In the case of FIG. 2, the printing medium 508 comes off the pinch roller 502 during the transition from the step S204 to the step S205. Thus, the printing areas up to P0 in FIG. 2 have the printing density shown in FIG. 3, the printing areas from P5 on have the printing density shown in FIG. 4, and the printing areas from P1 to P4 have the printing density shown in FIG. 5. As a result, uneven density can be observed as different-density bands generated in the resulting image, as shown in FIG. 6.

SUMMARY OF THE INVENTION

An object of the present invention is to provide a method and apparatus of printing an image on a printing medium, in which the printing speed is reduced as much as possible, so that the deterioration of the image quality on the latter part of the printing medium in the transport direction can be substantially reduced.

In a first aspect of the present invention, there is provided a printing apparatus for printing an image on a printing medium by repeating a printing scan of a printing head having a plurality of printing elements in a main-scan direction and a transport of the printing medium in a sub-scan direction perpendicular to the main-scan direction, comprising:

first printing control means for providing a complete image by performing printing scan for M times (M is an integral number: M≧1) using N printing elements (N is an integral number: N≧2) on the same printing area of the printing medium;

second printing control means for providing a complete image by performing printing scan for K times (K is an integral number: K>M) using L printing elements (L is an integral number: L≦N) on the same printing area of the printing medium; and printing-control switching means for allowing an image printing using the first printing control means for each printing area in a front side of the printing medium in the direction of transporting the printing medium and an image printing using the second printing control means for each printing area in a rear side of the printing medium in the direction of transporting the printing medium.

In a second aspect of the present invention, there is provided a printing method for printing an image on a printing medium by repeating a printing scan of a printing head having a plurality of printing elements in a main-scan direction and a transport of the printing medium in a sub-scan direction perpendicular to the main-scan direction, comprising the steps of:

providing a complete image by performing printing scan for M times (M is an integral number: M≧1) using N printing elements (N is an integral number: N≧2) on the same printing area in a front side of the printing medium in the direction of transporting the printing medium; and providing a complete image by performing printing scan for K times (K is an integral number: K>M) using L printing elements (L is an integral number: L≦N) on the same printing area in a rear side of the printing medium in the direction of transporting the printing medium.

In a third aspect of the present invention, there is provided a printing apparatus for printing an image on a printing medium by repeating a printing scan of a printing head having a plurality of printing elements in a main-scan direction and a transport of the printing medium in a sub-scan direction perpendicular to the main-scan direction, comprising:

first printing control means for providing a complete image by performing printing scan for M times (M is an integral number: M≧1) on the same printing area of the printing medium;

second printing control means for providing a complete image by performing printing scan for K times (K is an integral number: K>M) on the same printing area of the printing medium; and printing-control switching means for initiating an image printing by the first printing control means in a printing operation on the printing medium and switches from the image printing using the first printing control means to an image printing using the second printing control means depending on a transporting position of the printing medium.

In a fourth aspect of the present invention, there is provided a printing method for printing an image on a printing medium by repeating a printing scan of a printing head having a plurality of printing elements in a main-scan direction and a transport of the printing medium in a sub-scan direction perpendicular to the main-scan direction, comprising the steps of:

initiating an image printing on the printing medium by a printing operation in which a complete image is obtained by performing printing scan for predetermined times on the same printing area of the printing medium; and switching from the printing operation to another printing operation in which a complete image is obtained by performing printing scan for more times than the predetermined times on the same printing area of the printing medium.

According to the above aspects of the present invention, the printing movement of the printing head can be altered so that the number of the printing scan of the printing head for the same printing area on the printing medium can be increased. Consequently, the printing speed is reduced as much as possible, furthermore the deterioration of the image quality on the latter part of the printing medium in the transport direction can be substantially reduced.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a schematic diagram for explaining an example of the conventional multi-path printing system;

DETAILED DESCRIPTION OF THE PREFERRED EMBODIMENTS

Hereinafter, the preferred embodiments of the present invention are described with reference to the attached figures. Unless indicated otherwise, the same reference numbers are provided on the similar parts as those of the conventional example described above for omitting the explanations thereon. [An example of the configuration of the printing apparatus]

Figure 13:
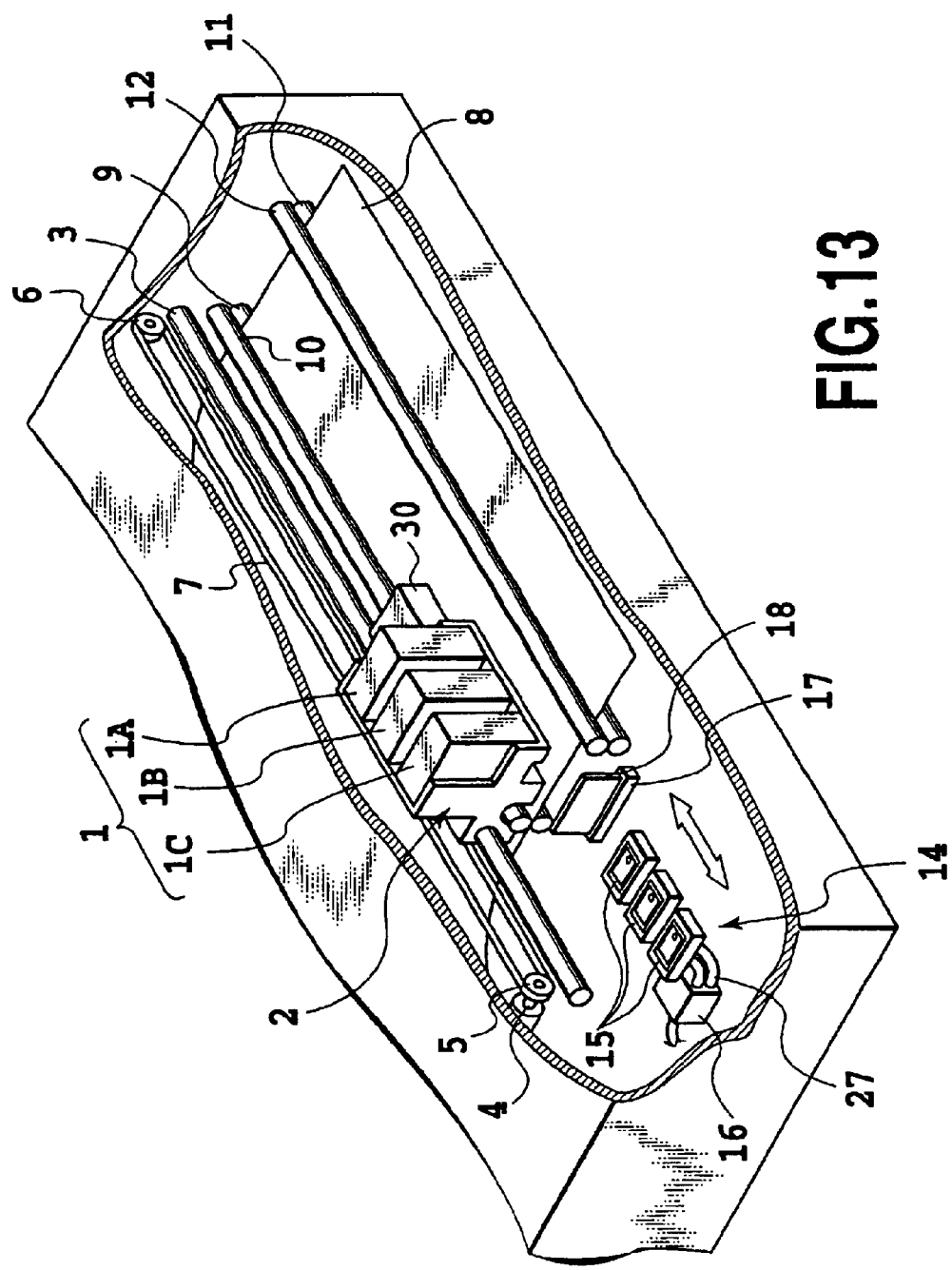
FIG. 13 is a schematic perspective diagram that illustrates the main constructive part of the ink jet printing apparatus applicable to the present invention.

FIG. 13 illustrates a main structural component of an ink jet printing apparatus that is applicable to the present invention. In the figure, a plurality of head cartridges (three head cartridges in this example) 1A, 1B, 1C are provided as printing means and replaceably mounted on a carriage 2. In addition, the cartridge 1A–1C has a connector for receiving a signal for driving its printing head portion. By the way, each cartridge 1A–1C may be in the form of an ink cartridge that comprises a printing head portion and an ink tank portion for supplying ink to the printing head part. Alternatively, it may be in the form of a printing head that receives ink from a distinctive ink tank.

In the following description, all of the printing means 1A–1C, or any one of them, may be simply referred to as a printing means, a printing head, or a head cartridge. The head cartridge 1 ejects ink droplets of different colors from their respective printing head portions to print an image on a printing medium. The printing head portions receive color inks from their respective ink tank portions that store cyan, magenta, and yellow color inks, respectively.

The head cartridge 1 is replaceably mounted on the carriage 2. The head cartridge 1 and the carriage 2 are electrically connected to each other. That is, the carriage 2 has a connector holder (electrical contact portion) that is electrically contacted with the above connector for transmitting a driving signal or the like from the carriage 2 to the head cartridge 1. A guide shaft 3 is mounted on the body of the apparatus to guide the carriage 2 without restraint in the main scan direction. The carriage 2 is connected to a timing belt 7 that runs between a motor pulley, 5 which is driven by a main-scan motor 4 and a driven pulley 6. Therefore, the carriage 2 can be transported in the main scan direction by the driving force of the main-scan motor 4.

A printing medium (a printing material) 8 such as a sheet of paper or a thin plastic plate is transported by the rotations of a pair of transport rollers 9, 10 and another pair of transport rollers 11, 12. The printing medium 8 is transported in the sub-scan direction, passing through a position (a printing position) facing an ink-ejection orifice surface of the printing head portion of the head cartridge 1. The back surface of the printing medium 8 is supported on a platen (not shown) so that the front surface (printing surface) becomes flattened. The ink-ejection orifice surface of the head cartridge 1 mounted on the carriage 2 is arranged so that it protrudes downwardly from the surface of the carriage 2. The ink-ejection orifice surface faces to the flat portion of the printing medium 8 within the space between the pair of transport rollers 9, 10 and the pair of transport rollers 11, 12.

Figure 1A:
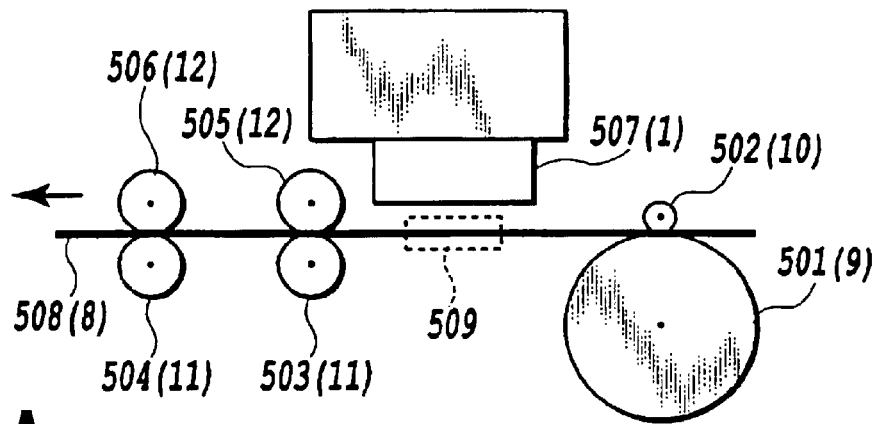
FIGS. 1A, 1B, and 1C are schematic diagrams for explaining the different feed stages of the printing medium in the common serial type printing apparatus.
Figure 1B:
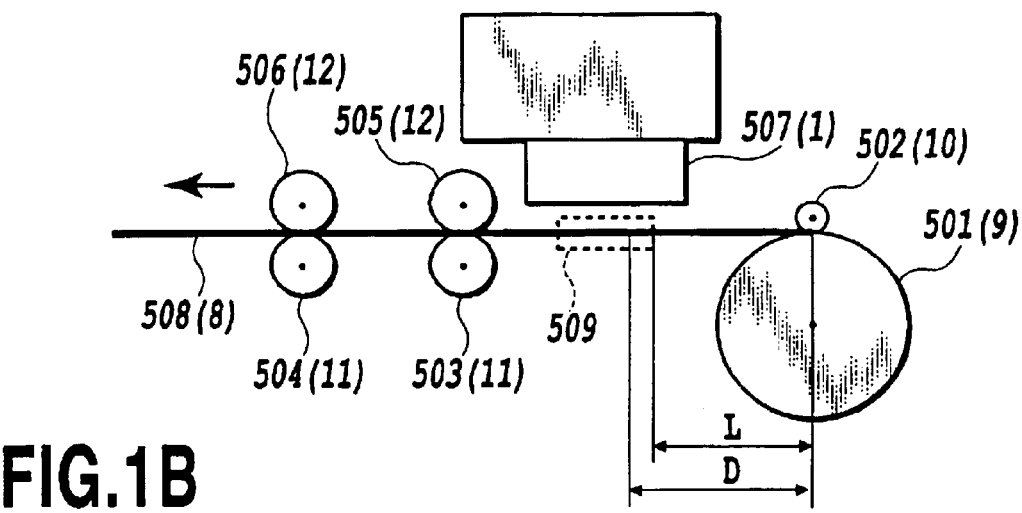
Figure 1C:
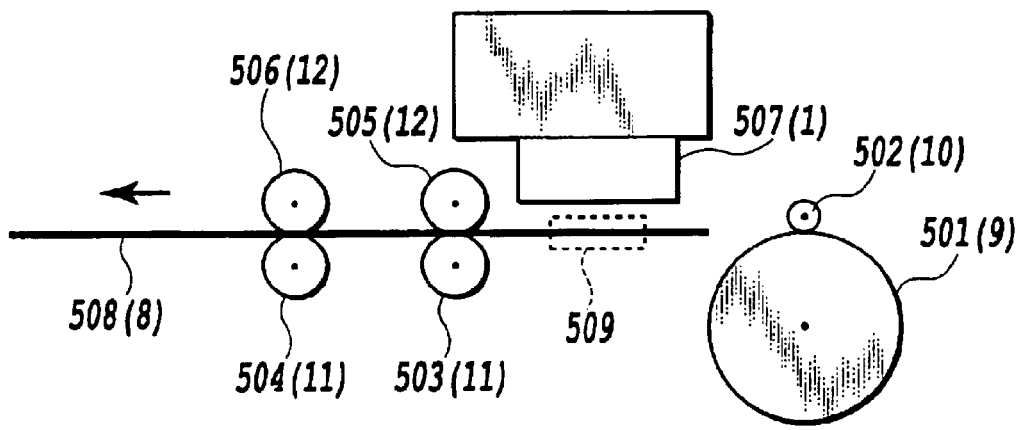
Figure 3:
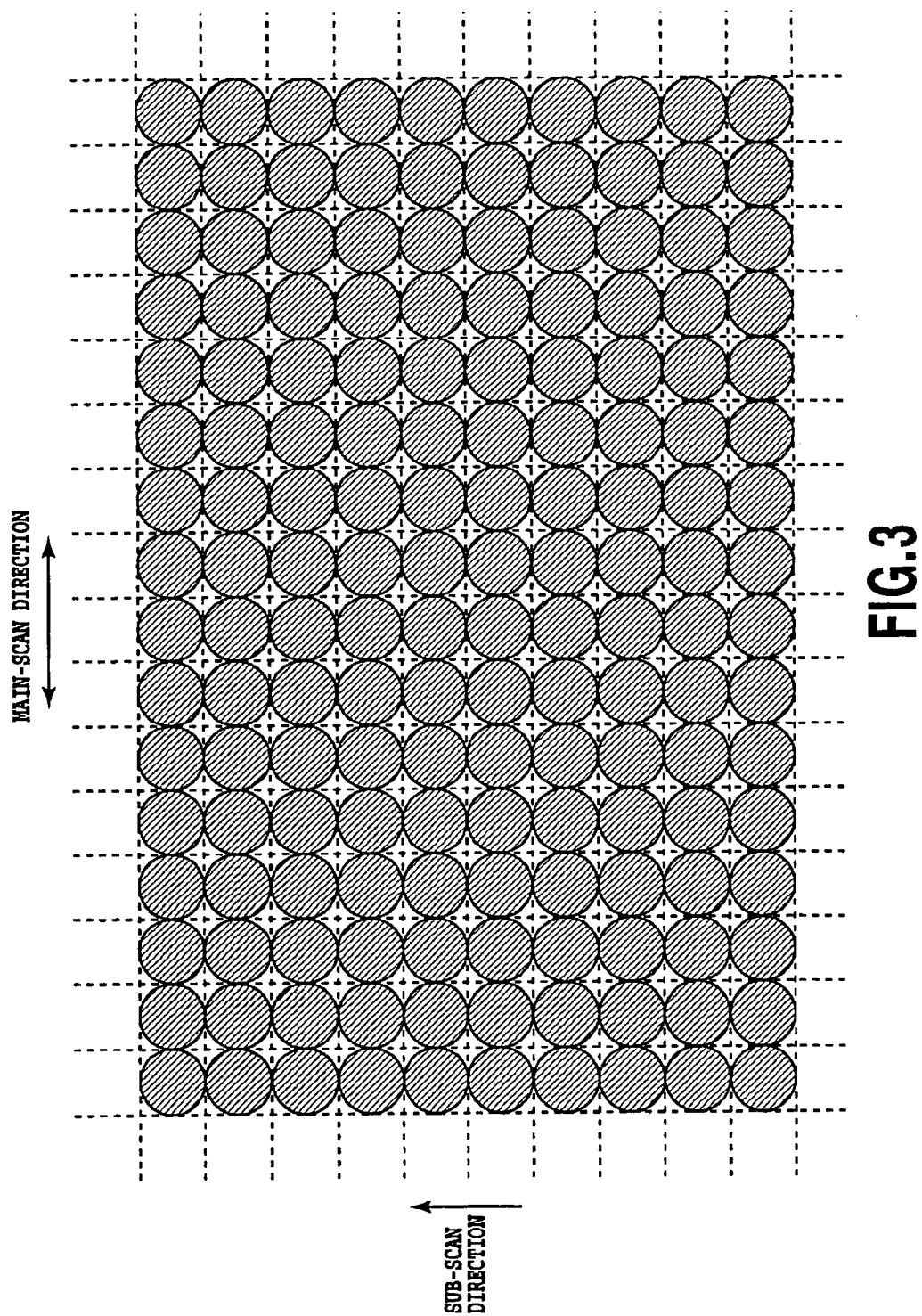
FIG. 3 is a schematic diagram for explaining the positions on which ink dots are formed in the state shown in FIG. 1A.
Figure 4:
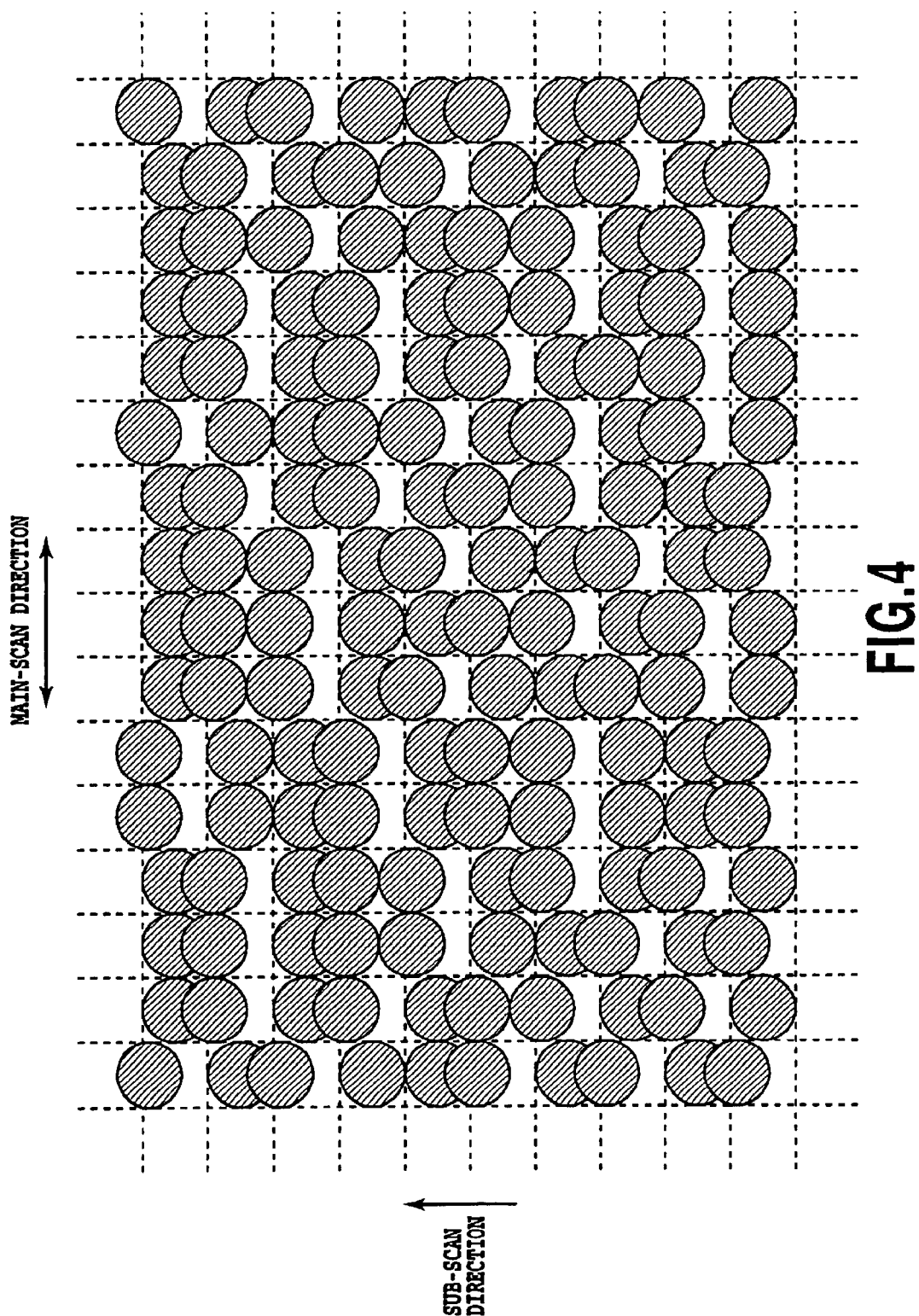
FIG. 4 is a schematic diagram for explaining the positions on which ink dots are formed in the state shown in FIG. 1C.
Figure 5:
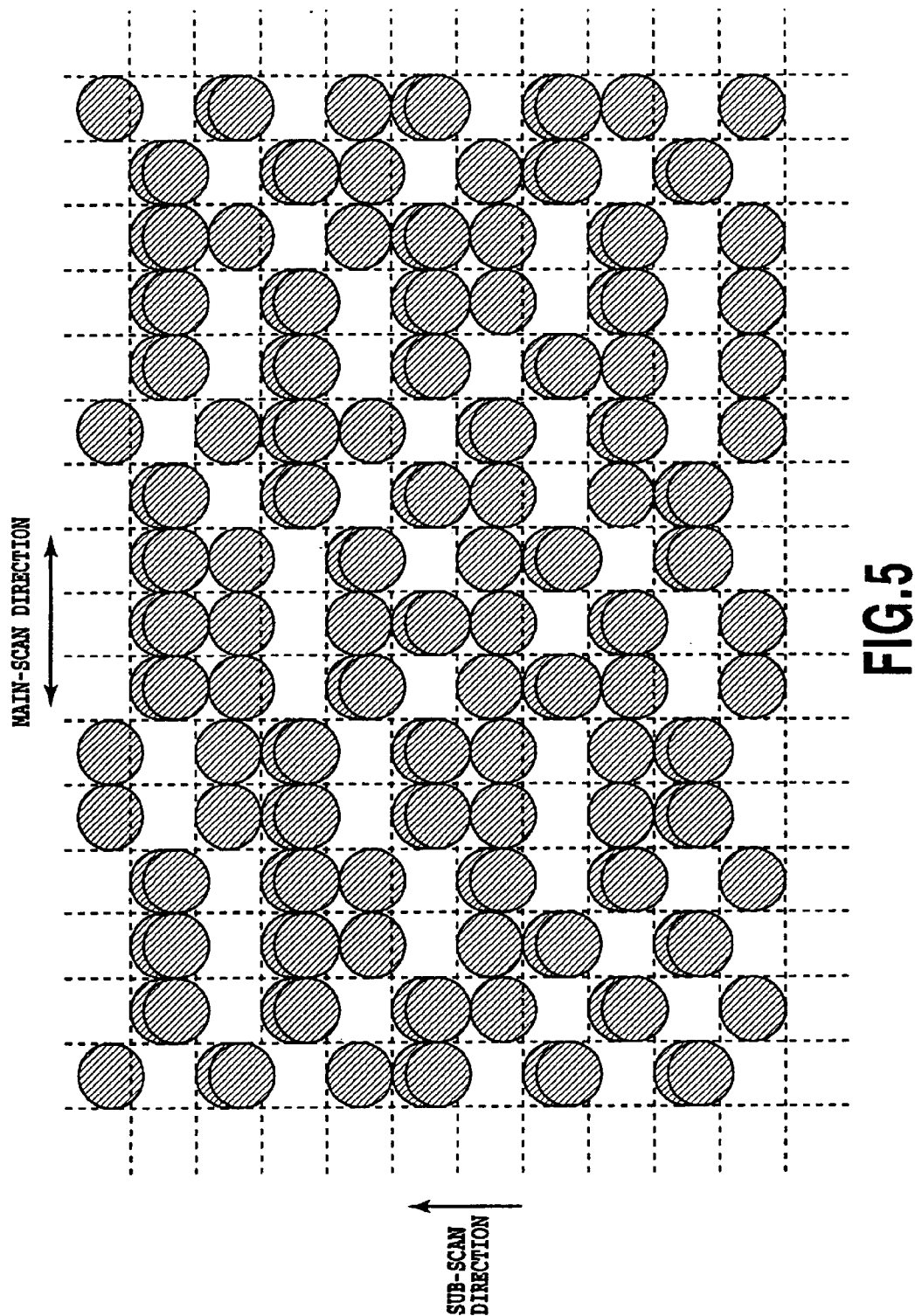
FIG. 5 is a schematic diagram for explaining the positions on which ink dots are formed in the state shown in FIG. 1C after passing through the state shown in FIG. 1B.

In the present embodiment, the pair of transport rollers 9, 10 corresponds to the rollers 501, 502 in FIG. 1 and the pair of transport rollers 11, 12 corresponds to rollers 503, 505 or the rollers 504, 506 in FIG. 1.

The printing head portion of the head cartridge 1 in the present embodiment may be provided as one of components that make up an ink jet printing means for ejecting ink droplets from its orifices using thermal energy. The printing head portion comprises a plurality of ejecting heaters (electro-thermal transducers) to generate the thermal energy. As described later, each thermal electro-thermal transducer provides thermal energy to the ink, thereby to cause a film-boiling phenomenon. The film-boiling phenomenon produces pressure-changes by growth or shrinkage of a bubble in the ink so that an ink droplet can be ejected from the ink-ejection orifice.

In FIG. 13, reference numeral 14 denotes a recovery means for keeping an excellent ink-ejection state of the printing head portion. The recovery means 14 comprises caps 15 for capping the front surfaces (ink-ejection surfaces) of the printing head portions of the head cartridges 1A–1C, respectively. The inside of each cap 15 communicates with a pump 16 through a tube 27, so that the pump 16 forms a negative pressure in the cap 15 by suction to draw ink from the ink-ejection orifices of the printing head portion to the inside of the cap 15 (a suction-recovery operation). Alternatively, idle ink (i.e, that does not contribute to printing) may be ejected from the ink-ejection orifices of the printing head portion to the cap (an ejection-recovery operation). Therefore, such recovery operations allow an excellent ink-ejection state to be maintained. Furthermore, reference numeral 18 denotes a blade that is held in a holder 17 so that the blade 18 can be positioned on a path along which the ink-ejection surface of the printing head portion moves. Thus, the blade 18 wipes the ink-ejection surface of the printing head portion as the printing head moves on the blade 18.

Figure 14:
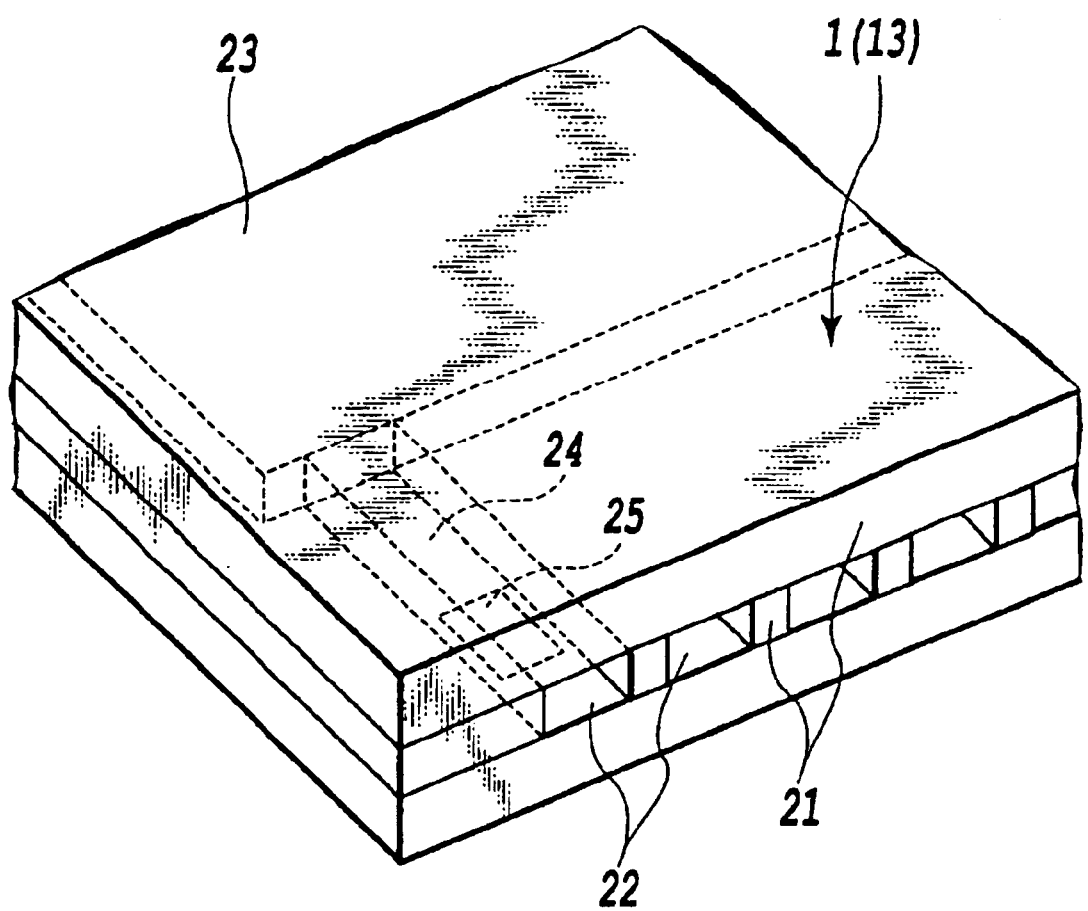
FIG. 14 is a schematic perspective diagram that illustrates the head cartridge of the printing apparatus shown in FIG. 13, where the main structural part of the ink-discharge part is partially indicated by the broken lines.

FIG. 14 is a schematic perspective diagram that partially illustrates the principal structural components of ink-ejection portion 13 of the printing head portion. In the figure, ejection surface 21 of the ink-ejection portion 13 is positioned at a predetermined distance (about 0.5 to 2 mm) from the surface of the printing medium 8, facing each other. In addition, FIG. 14 shows a plurality of ejection orifices 22 formed on such an ejection surface 21 with predetermined pitches. In this embodiment, there are 256 orifices at intervals, with a density of 360 dpi. Furthermore, as described above, an ejecting heater (an electro-thermal transducer such as a heating resistance element) 25 generates thermal energy to be used for ejecting the ink. The ejecting heaters are arranged along a wall surface of each channel 24, which communicates with a common liquid chamber 23 and ejection orifice 22. The head cartridge 1 of the present invention is mounted on the carriage 2 so that the ejection orifices 22 of the printing head portion can be lined up in the direction perpendicular to the main-scan direction of the carriage 2. Then, a film boiling phenomenon is caused in the ink in the channel 24 by actuating (applying power to) the ejecting heater 25 on the basis of an image signal or a ejecting signal, and pressure-changes produced by growth or shrinkage of a bubble in the ink eject an ink droplet from the ink-ejection orifice 22.

Figure 15:
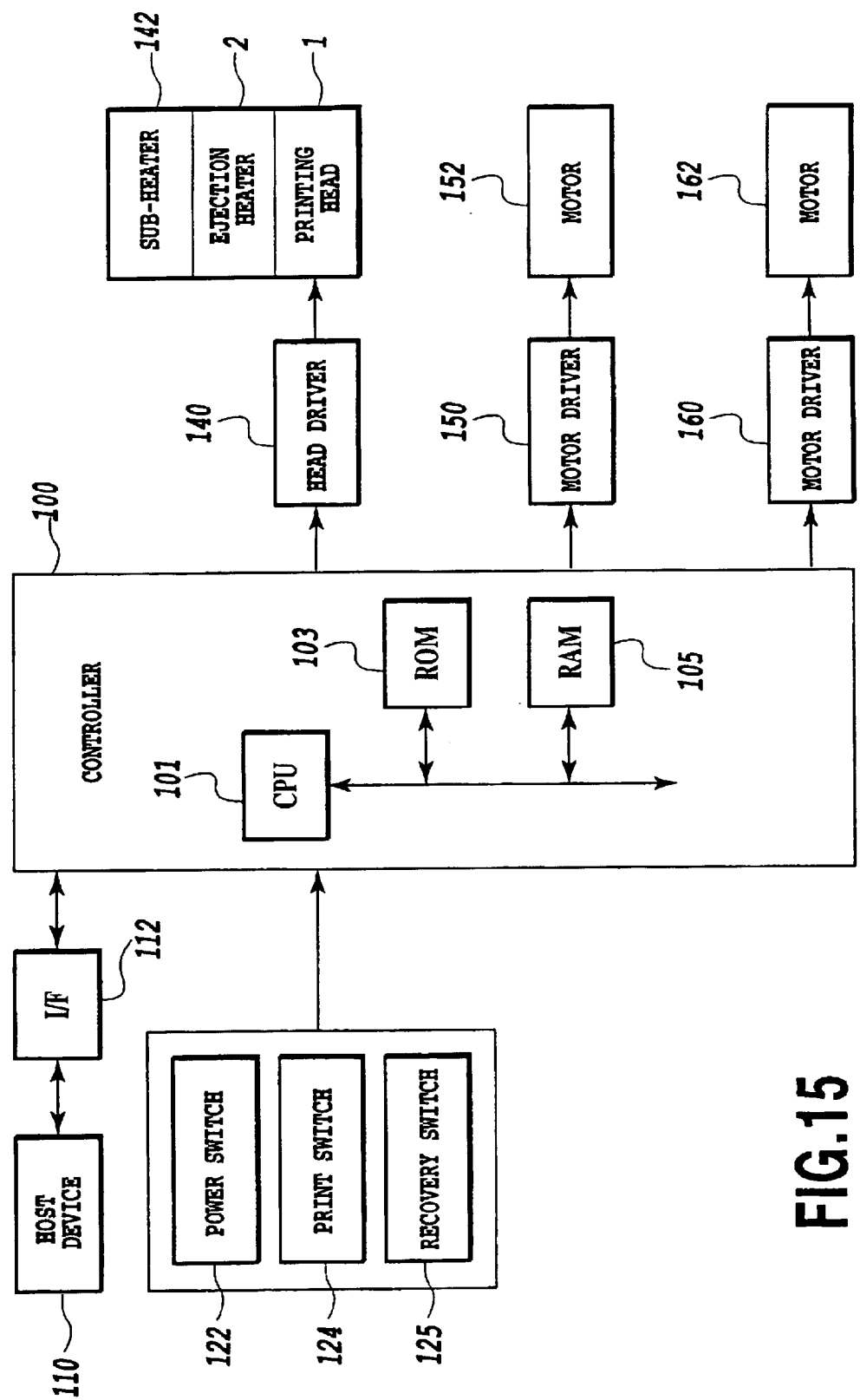
FIG. 15 is a block diagram of the control circuit of the ink jet printing apparatus shown in FIG. 13.

Referring now to FIG. 15, there is shown a block diagram that illustrates the principal configuration of the control circuit equipped in the ink jet printing apparatus of FIG. 13. In FIG. 15, a controller 100 is provided as a main control portion that comprises, for example, a central processing unit (CPU) 101 in the form of a micro-computer, a read only memory (ROM) 103 that stores programs, desired tables, and other fixed data, and a random access memory (RAM) 105 in which unfolding image data and work areas are formed. A host device 110 is the image-data supplying source (e.g., a computer for forming image data or the like to be printed or recorded, processing such data, and so on, or alternatively any device such as a reader for reading image data). Transmission and reception of any data of images, commands, status signals and so on can be performed between the host computer 110 and the controller 100 through an interface (I/F) 112.

An operation portion 120 comprises a group of switches that receive any instruction from the operator. These switches include an electric power switch 122, a switch 124 for instructing the initiation of a printing operation, a recovery switch for instructing the initiation of an absorbing-recovery operation, and so on. In FIG. 15, a head driver 140 actuates the ejecting heaters 25 in each ink jet cartridge 1A–1C in response to the print data or the like. The head driver 140 comprises a shift resistor that brings the print data into line so as to correspond to the respective ejecting heaters 25, a latch circuit for latching the print data in appropriate timing, a logic circuit element for actuating the ejecting heaters in synchronization with the drive-timing signals, and a timing-adjusting portion for appropriately adjusting the drive-timing (ejecting-timing) for adjusting the position on which an ink dot is formed.

In the printing head 1, there is also provided a sub-heater 142 that performs temperature control for stabilizing the ink-ejection characteristics. The sub-heater 142 may be simultaneously formed with the ejecting heater 25 on the substrate of the printing head 1, or provided on the body of the printing head 1 or the head cartridge. A motor driver 150 is provided for driving a main-scan motor 152, while a motor drive 160 is provided for driving a sub-scan motor 162 that transports the printing medium 8 in the sub-scan direction.

[First Embodiment]

In this embodiment, an ink jet printing apparatus performs a printing operation based on a two-path printing system (i.e., a first printing operation) on a front-half area of a printing medium such as a sheet of printing paper. The front-half area is positioned toward the front side of the printing medium in the transporting direction. The apparatus performs another printing operation based on a six-path printing system (i.e., a second printing operation) on the rear-half area of the printing medium. The rear-half area is positioned toward and at the rear side of the printing medium in the transporting direction (but need not be as much as half the area of the sheet or of the printed region. During the first printing operation, a printing scan using 256 nozzles of the printing head portion and a transport of the printing medium by distances corresponding to 128 nozzles, are repeated to perform the two-path printing. During the second printing operation, on the other hand, a printing scan using 192 nozzles and a transport of the printing medium by distances corresponding to 32 nozzles are repeated to perform the six-path printing.

Figure 8:
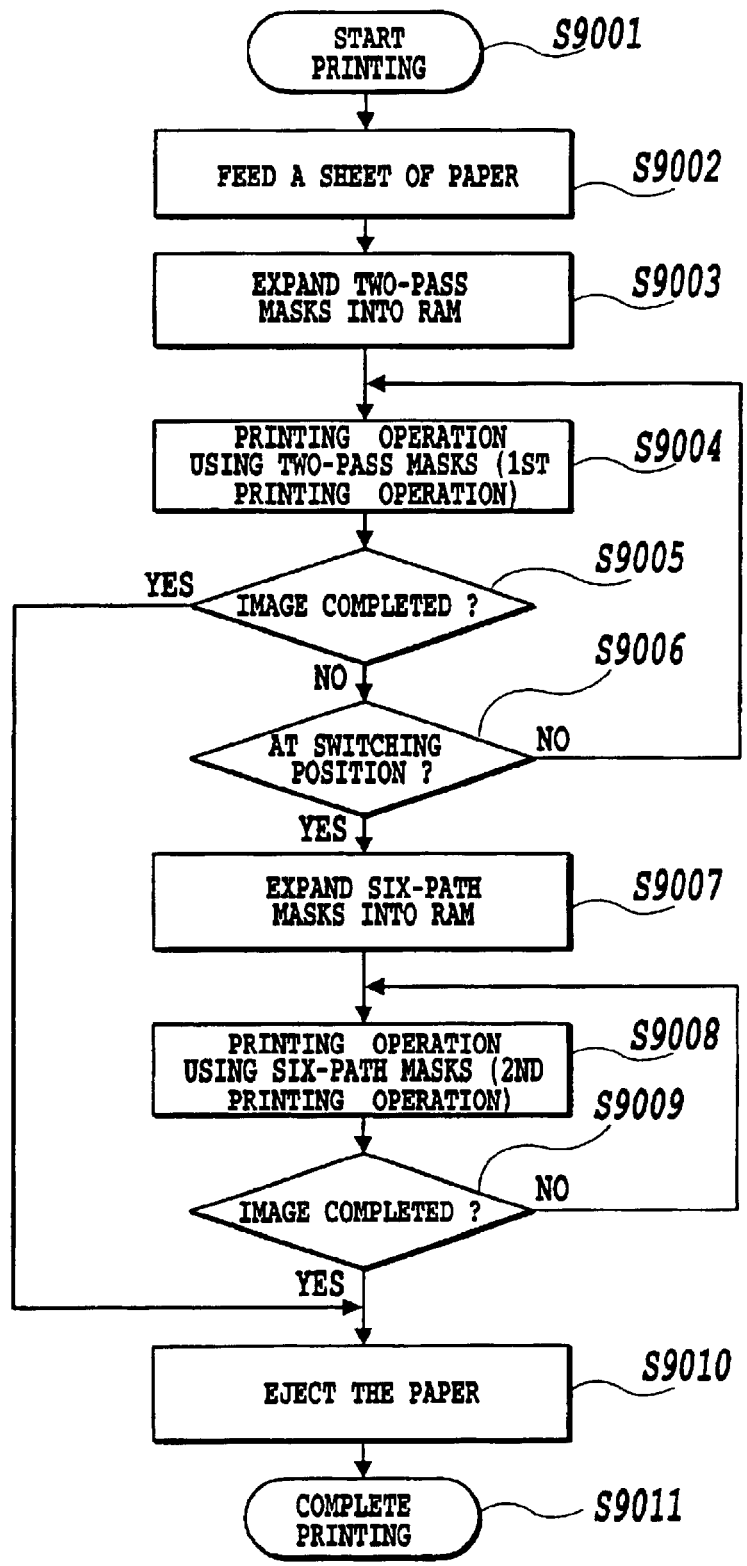
FIG. 8 is a flow chart for explaining the procedure of controlling the printing movement in one of the embodiments of the present invention.

FIG. 8 is a flowchart that illustrates the control procedure of the printing operation of the ink jet printing apparatus in accordance with the present embodiment.

In the procedure of controlling the printing operation, as described below, the printing of an image on a printing medium is initiated by a predetermined printing operation, followed by switching the printing operation to another one on the basis of the position on which the printing medium is transported. The predetermined initial printing operation at the time of initiating the printing corresponds to the first printing operation described above. On the other hand, the printing operation after the switching in the middle of the image printing on the printing medium corresponds to the second printing operation described above. Therefore, in the middle of printing the image on the printing medium, the printing operation is changed so that the numbers of scannings of the printing head 1 over the predetermined printing area of the printing medium for completing the image formation can be increased by the following steps.

First, printing is started in step S9001, followed by feeding the printing medium in the sub-scan direction in step S9002.

In step S9003, random masks (A2, B2) for two-path printing system are expanded in the RAM 105 mounted on the body of the printing apparatus (see FIG. 15).

Then, the first printing operation including a printing scan using 256 nozzles and an operation of transporting the printing medium by distances corresponding to 128 nozzles is performed using the masks A2, B2 expanded in the RAM 105 in step S9004.

In step S9005, it is determined whether the image is formed completely on the whole printing area. If the image formation is finished, then the printing medium is ejected from the printing apparatus in step S9010, followed by completing the printing in step S9011. If the image formation is not finished (step S9005), then the process proceeds to step S9006 to determine whether the position of the finished image on the printing medium has reached the switching position of the printing control (the position where the first and second printing operations are switched). If the image formation up to the switching position is not completed, then steps S9004, S9005, and S9006 are repeated. In step S9006, if the image formation up to the switching position is completed, then the process proceeds to step S9007.

In step S9007, random masks A6, B6, C6, D6, E6, and F6 for 6-path printing system are expanded in the RAM 105 in the body of the printing apparatus.

Then, in step S9008, the second printing operation including a printing scan using 192 nozzles and an operation of transporting the printing medium by distances corresponding to 32 nozzles is performed using the masks expanded in the RAM 105 in step S9007.

In step S9009, it is determined whether the image formation on the whole printing area has been completed. If so, then the process proceeds to step S9010 to discharge the printing medium from the printing apparatus, followed by completing the printing in step S9011. In the step S9009, if image formation is not completed, then the process proceeds to step S9008 to repeat the second printing operation until the image formation is complete. Therefore, the second printing operation is not performed until the printed image reaches the switching position.

Figure 7:
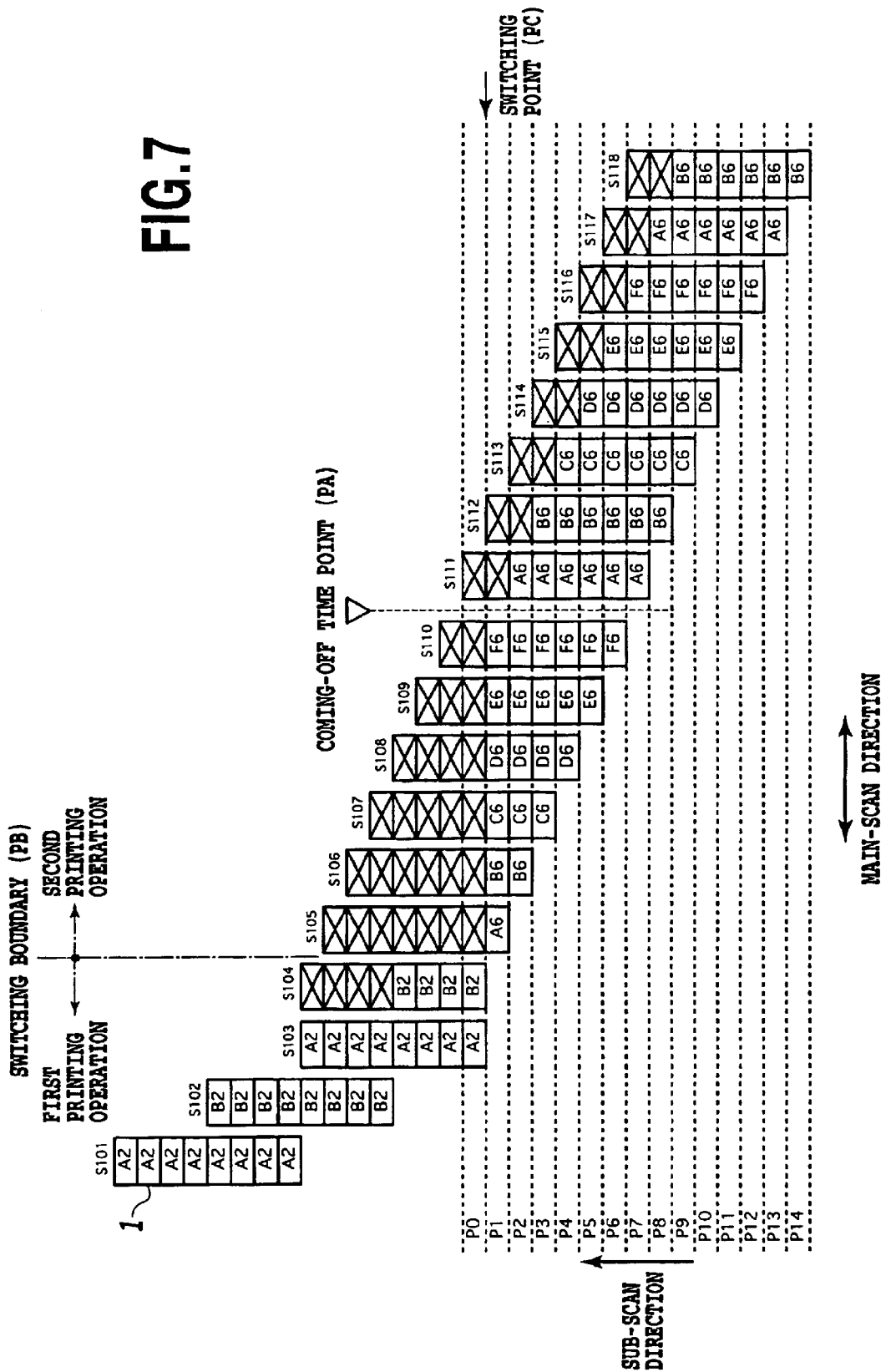
FIG. 7 is a schematic diagram for explaining the printing system as one of the embodiments of the present invention.

FIG. 7 is a schematic diagram that illustrates the first and second printing operations before and after passing through the switching position (PC), respectively. In this figure, just as in the case of FIG. 2, an area of using the nozzles of the printing head 1, masks to be used, and the relative position between the printing head 1 and the printing medium. The switching position PC for switching between the first and second printing operations corresponds to the boundary between the areas P0 and P1.

Firstly, in steps from S101 to S103, the first printing operation is performed as a two-path printing system by alternately using the random masks A2 and B2. In the first printing operation, a printing scan operation using all 256 nozzles and an operation of transporting the printing medium by distances of corresponding to half of the nozzles (i.e., 128 nozzles) are repeated.

In step S104, the printing medium is not transported, while the nozzles positioned on the upstream side of the feeding direction of the printing medium (the lower side of FIG. 7) are used. Therefore, the image formation, which should be completed before passing through the switching position PC, is completed.

In the next step S105 and the subsequent steps, the second printing operation of 6-path printing system is performed. In the second printing operation, a transport of the printing medium by distances corresponding to 32 nozzles, and a printing scan operation using random masks A6, B6, C6, D6, E6, and F6 in that order is repeated.

Furthermore, in the printing scan operations in step S104 and the subsequent steps, blank image data is provided about the area where the image is already completed while the printing data is abandoned. In step S104, for example, the printing data corresponding to the area on which the image formation is completed in the preceding steps S102, S103, i.e., the printing data for 128 nozzles in the downstream side of the feeding direction of the printing medium (the upper side of FIG. 7), receives blank data instead of the printing data being abandoned. Therefore, substantially, the printing operation using those 128 nozzles is not performed. Step S105 and the subsequent steps are performed in an analogous fashion, so that the nozzles corresponding to the area on which the image formation is completed in the preceding steps are not used. In FIG. 7, the nozzle marked by "x" means that blank data is provided with respect to an printing scan area corresponding to such an x-marked nozzle.

In FIG. 7, the printing operation until step S104 corresponds to first printing operation described above, while the printing operations from step S105 corresponds to the second printing operation described above. The boundary time PB for switching these printing operations is adjusted so that the printing medium comes off the pinch roller 502 (10) at the time point PA in a specified period after the boundary time PB. The specified period corresponds to the period of transporting the printing medium after the printing scan on an area (area P0 in the present embodiment) immediately preceding an area on which the image formation is completed at first by the second printing operation (area P1 in the present embodiment). In other words, the specified period is the transporting period of the printing medium after the step S103. As shown in FIG. 1B, if the distance from the pinch roller 502 (10) to the printing area 509 of the printing head 507 (1) is defined as "L", the distance from the rear end of the printing medium 508 (8) to the switching position PC is defined as "D", the feeding amount of the printing medium at a time in the second printing operation is defined as "F" (corresponding to 32 nozzles in the present embodiment), the number of paths in the second printing operation is defined as N (6 paths in the present embodiment), and the accuracy of detecting the rear end of the printing medium is defined as ±ΔA, the most efficient printing rate can be attained when these factors are represented by the following equation:

$$D = L + \Delta A + F \times (N-1)$$

The means for detecting the position of the rear end of the printing medium may be one using a sensor located on the position in the upstream of the sheet-feed (the position on the right side of FIG. 1) with respect to the pinch roller 502 (1). Alternatively, as the detection means, another means, such as a means for determining the position of the rear end of the printing medium, may be used. That is, the means determines the position of the rear end of the printing medium on the basis of the data of the whole length of the printing medium and the transport distance from the point at the time of detecting the front end of the printing medium. An appropriate switching position PC is defined from the above equation by determining the position of the rear end of the printing medium. In FIG. 7, the printing medium comes out of the pinch roller 502 (10) at the time of transporting the printing medium when the process proceeds from step S110 to step S111 (such a time point is referred to as a "coming-off time point PA").

Figure 9:
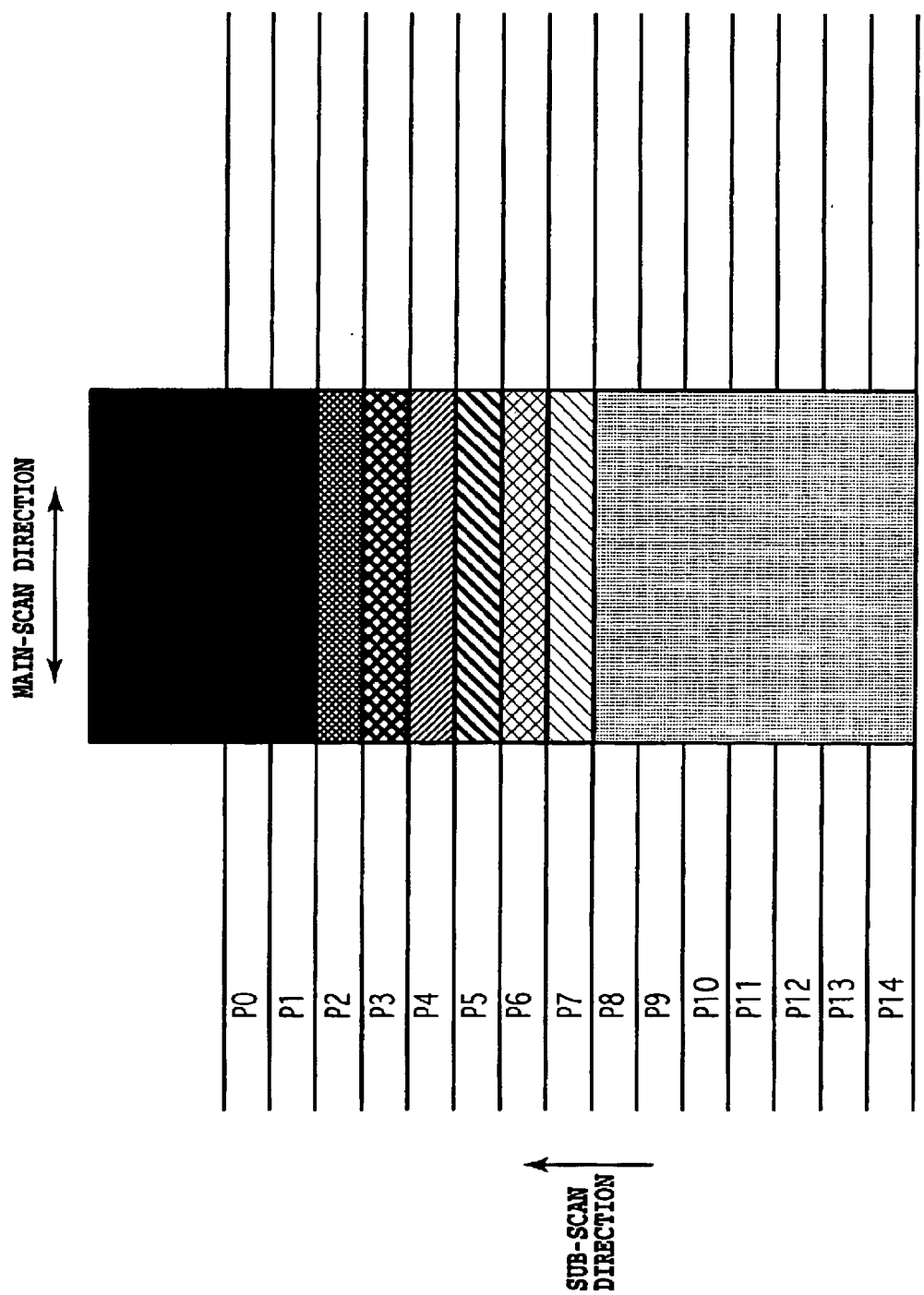
FIG. 9 is a schematic diagram for explaining the results of the printing based on the printing system shown in FIG. 7.

FIG. 9 is a schematic diagram that illustrates the image, which is uniformly printed all over the printing area of the printing medium using the printing procedure described above. In FIG. 9, the image formation can be performed by ideally spotting ink droplets on the printing area up to the area P1. In one of the printing scan (printing scan of step S111) in the sixth printing scan, the image formed on the area P2 is under the influences of the printing medium that comes out of the pinch roller 502 (10), and the difference between the feed amount of the transport roller 501 (9) and the feed amount of the sheet-ejection rollers 503 to 506 (11, 12). In the area P2, therefore, the position on which the ink is spotted can be deviated from the predetermined position in proportion to the sum of those influences. Each of the random masks A6, B6, C6, D6, E6, and F6, macroscopically, has its own uniform rate of thinning out macroscopically, so that in printing by a single printing scan using one of the above random masks, ⅙ of the printing image data is thinned out.

In the conventional 2-path printing system as shown in FIG. 2, for example, the reduction in the amount of image density due to the fact that the printing medium comes out of the pinch roller is defined as $\Delta DA$, and the reduction in the amount of image density at the time of transporting the printing medium over distances of corresponding to 128 nozzles in response to the difference between the feed amount of the transport roller and the feed amount of the sheet-ejection roller is defined as $\Delta DB$. It may be simply considered that there is a proportional relation between the reduced image density and the amount of deviation from the expected ink-spotted point. In that case, the reduced amount of image density on the area printed by the printing method of the present invention can be represented by the following equations In addition, in this embodiment, the 6-path printing system has been already performed when the printing medium comes out of the pinch roller. Therefore, in the following equations, the reduced amount of image density is calculated on the assumption that the reduced amounts of image densities in the present embodiment may be ⅓ (=2 paths/6 paths) of the reduced amounts of the image densities $\Delta DA$, $\Delta DB$ in the conventional one shown in FIG. 2. In addition, in the interest of simplicity, a proportional relation between the reduced image density and the amount of deviation from the expected ink-spotted point is considered. Thus, the calculations are performed in consideration of the ratio between the feed amount of the printing medium corresponding to a distance from the coming-off point PA to each printing area and the feed amount of the printing medium corresponding to 128 nozzles.

(Decline in image density at $P2$)=$\Delta DA/3+\Delta DB\times(32/128)/3=0.33 \Delta DA+0.08 \Delta DB$ (Decline in image density at $P3$)=$\Delta DA/3+\Delta DB\times\{(32+64)/128\}/3=0.33 \Delta DA+0.25 \Delta DB$ (Decline in image density at $P4$)=$\Delta DA/3+\Delta DB\times\{(32+64+96)/128\}/3=0.33 \Delta DA+0.50 \Delta DB$ (Decline in image density at $P5$)=$\Delta DA/3+\Delta DB\times\{(32+64+96+128)/128\}/3=0.33 \Delta DA+0.83 \Delta DB$ (Decline in image density at $P6$)=$\Delta DA/3+\Delta DB\times\{(32+64+96+128+160)/128\}/3=0.33 \Delta DA+1.25 \Delta DB$ (Decline in image density at $P7$)=$\Delta DA/3+\Delta DB\times\{(32+64+96+128+160+192)/128\}/3=0.33 \Delta DA+1.75 \Delta DB$ (Decline in image density at $P8$)=$\Delta DB\times\{(32+64+96+128+160+192+224)/128\}/3=2.33 \Delta DB$ Furthermore, if it is defined as $\Delta DA=\Delta DB\times2$, the difference between the image densities of the adjacent areas may be represented by the following equations.

Figure 6:
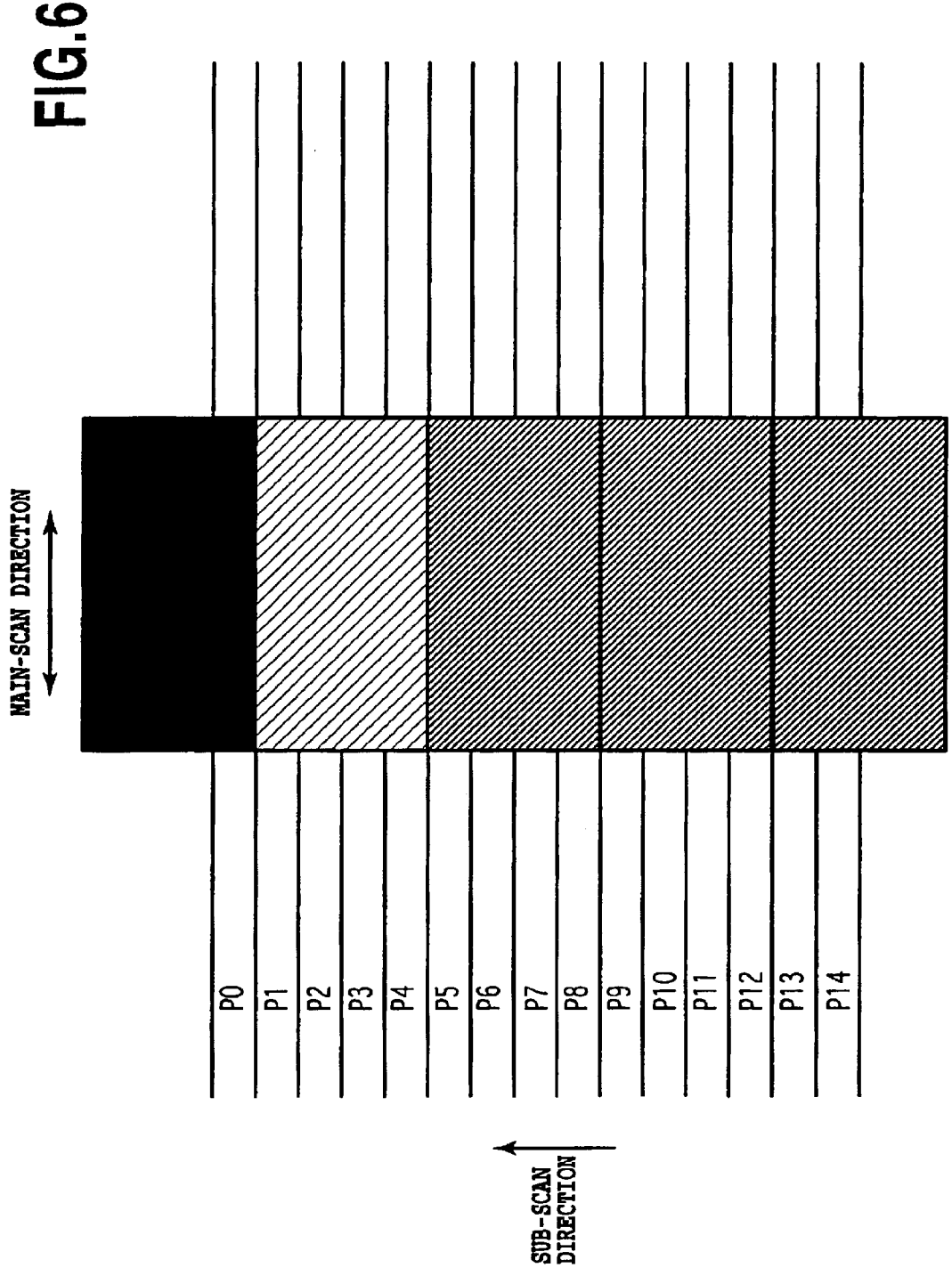
FIG. 6 is a schematic diagram explaining the results of the printing based on the printing system shown in FIG. 2.

(The density difference between $P1$ and $P2$)=$-0.33 \Delta DA-0.08 \Delta DB=-0.75 \Delta DB$ (The density difference between $P2$ and $P3$)=$-0.17 \Delta DB$ (The density difference between $P3$ and $P4$)=$-0.25 \Delta DB$ (The density difference between $P4$ and $P5$)=$-0.33 \Delta DB$ (The density difference between $P5$ and $P6$)=$-0.42 \Delta DB$ (The density difference between $P6$ and $P7$)=$-0.50 \Delta DB$ (The density difference between $P7$ and $P8$)=$-0.33 \Delta DA-0.58 \Delta DB=0.08 \Delta DB$ On the other hand, the density difference between the adjacent areas in the conventional example shown in FIG. 6 may be represented by the following equations.

(The density variation between $P0$ and $P1$)=$-\Delta DA-\Delta DB=-3.00 \Delta DB$ (The density variation between $P4$ and $P5$)=$\Delta DA-\Delta DB=\Delta DB$ From the results of the above comparisons, the density difference between the adjacent printing areas in the present embodiment is substantially smaller than that of the conventional one. Therefore, by performing the printing control of the present embodiment, the amount of change in density between adjacent areas can be reduced compared with that of the conventional one, allowing a decrease in image deficiencies which can be visually recognized.

Figure 10:
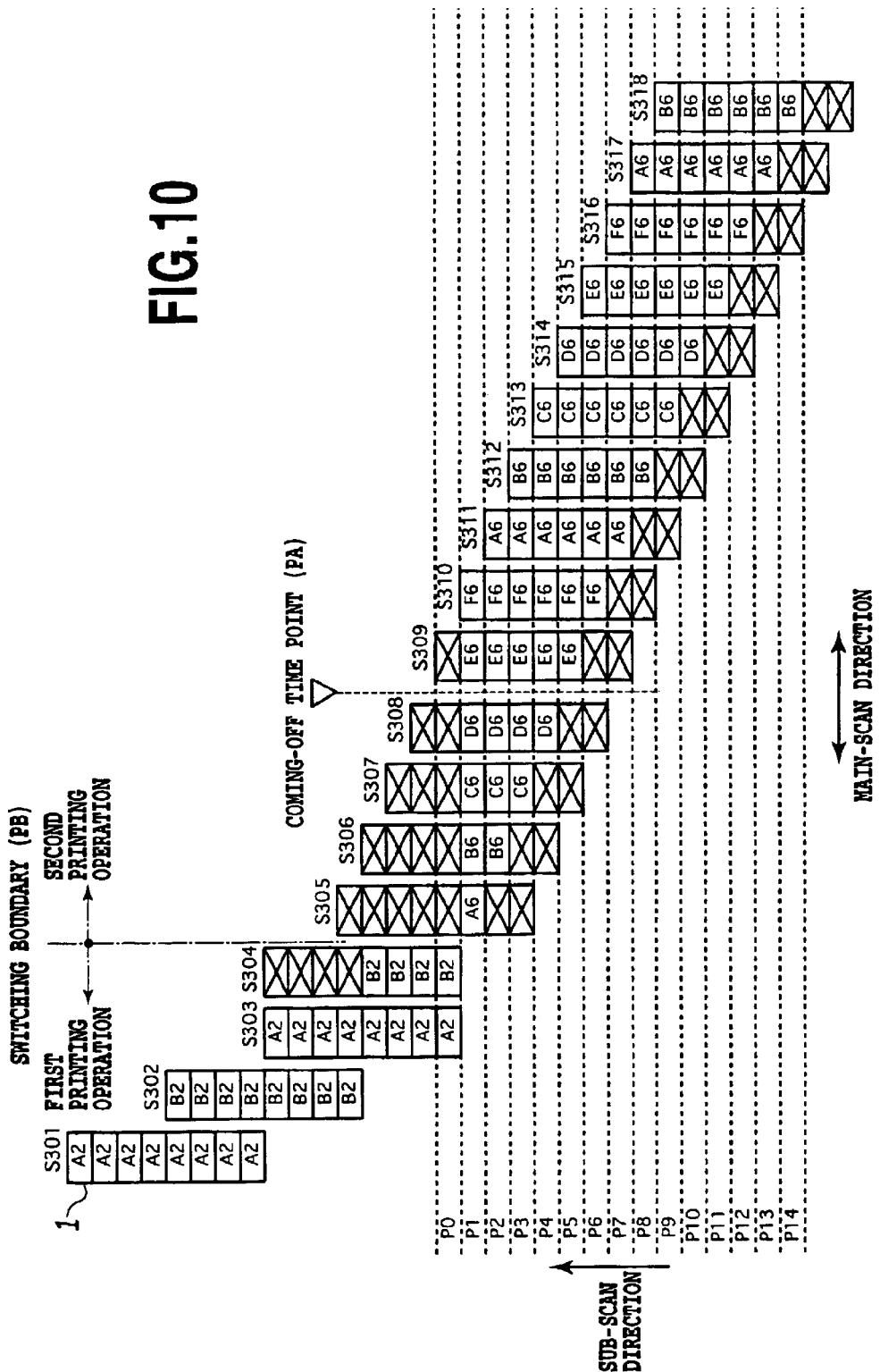
FIG. 10 is a schematic diagram for explaining the printing system as another embodiment of the present invention.

In the present embodiment, the nozzle on the sheet-feed side (the lower side of FIG. 7) is used in the control of the second printing operation. However, the nozzle on the sheet-ejection side (the upper side of FIG. 7) may be used in the steps from S305 for the second printing operation as shown in FIG. 10. In the case of FIG. 7, as described above, the printing medium comes off the pinch roller when the printing medium is transported at the boundary between the step S110 and the step S111. In the case of FIG. 10, on the other hand, the position of the nozzle group used in the control of the second printing operation is shifted toward the sheet-ejection side, so that the printing medium is able to come off the pinch roller when the printing medium is transferred at the boundary between step S308 and step S309. Therefore, the width of the printing area for the first printing operation using the nozzles on the sheet-ejection side as shown in FIG. 10 becomes narrow compared with one using the nozzles on the sheet-feed side as shown in FIG. 7.

(Other Embodiments)

In the above embodiment, the first printing operation of two paths, in which the printing scan using 256 nozzles and the transport of the printing medium over distances corresponding to 128 nozzles are repeated, is performed on each of the predetermined printing areas located in the front end portion of the printing medium such as a sheet of paper in the transport direction. In addition, the second printing operation of six paths, in which the printing scan using 192 nozzles and the transport of the printing medium over distances corresponding to 32 nozzles are repeated, is performed on each of the predetermined printing areas located in the rear end of the printing medium in the transport direction. By the way, it is not appropriate to increase the number of paths in the multi-path printing system in the case that the printing medium comes off the pinch roller with little influence on the feed amount of the printing medium, for the following reasons. That is, if the number of paths is increased, the feed amount of the printing medium at the time of printing the image on the same printing area during the first and last paths are increased, respectively, to increase the degree of reducing the image density depending on the difference between the feed amount of the transport roller and the feed amount of the sheet-ejection roller.

Figure 11:
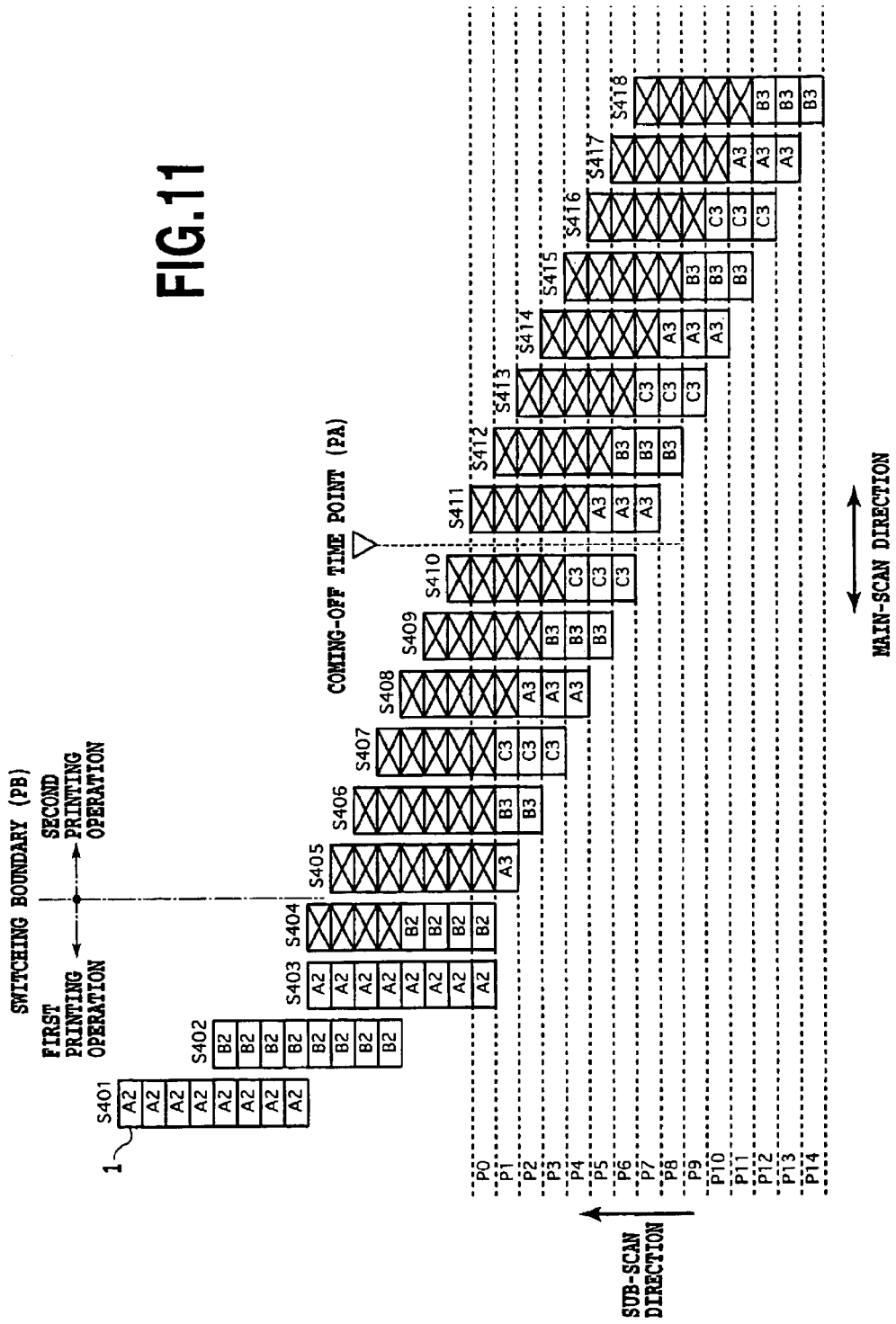
FIG. 11 is a schematic diagram for explaining the printing system as still another embodiment of the present invention.

Therefore, in the case that the printing medium comes off the pinch roller with little influence on the feed amount of the printing medium, it is preferable to reduce the number of nozzles to be used by the application of 3-path printing system as a second printing operation as shown in FIG. 11. In the 3-path printing system, a printing scan using the 96 nozzles on the sheet-feed side and transporting the printing medium over distances corresponding to 32 nozzles are repeated.

Figure 12:
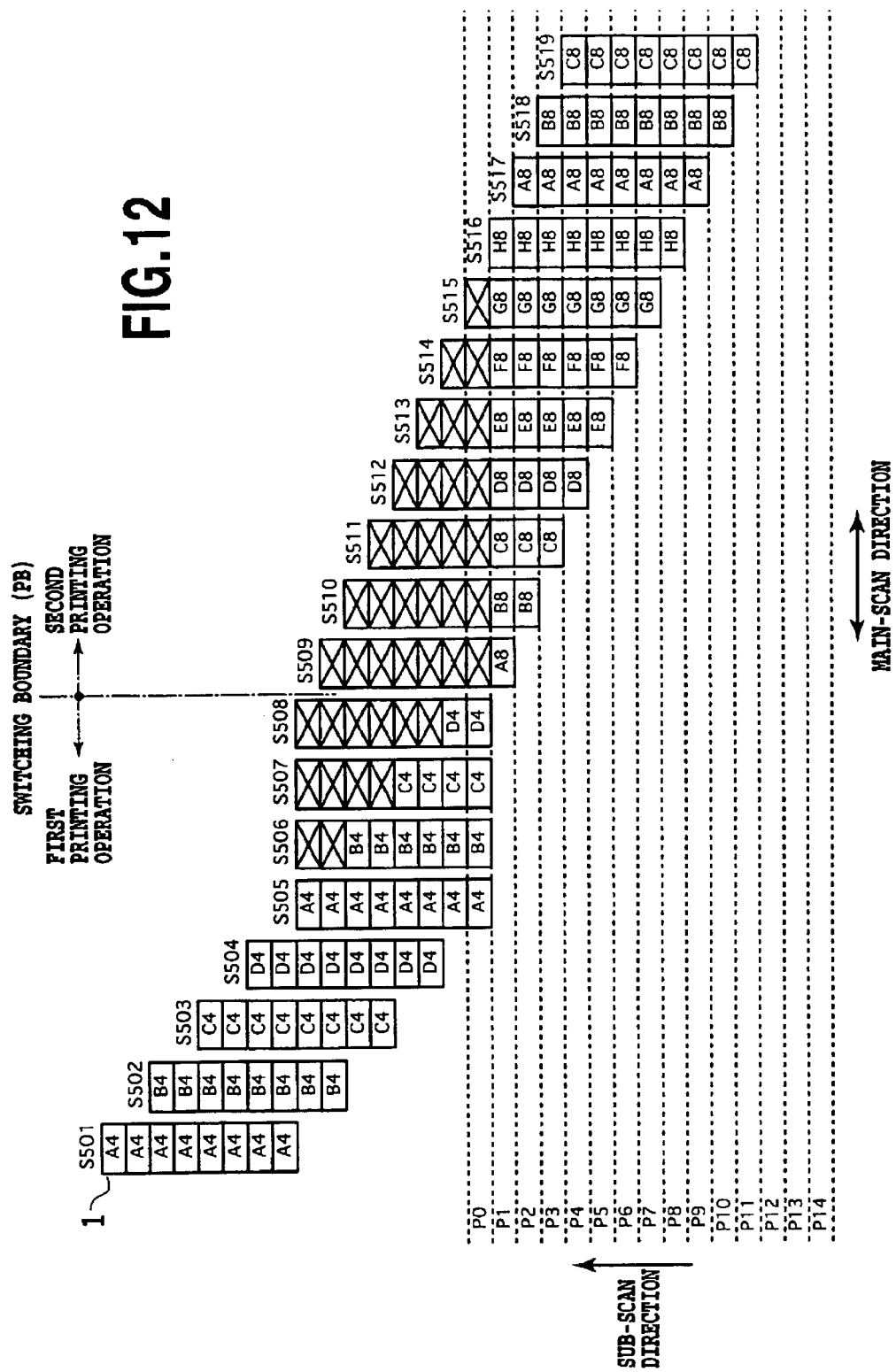
FIG. 12 is a schematic diagram for explaining the printing system as further still another embodiment of the present invention.

In another embodiment a first printing operation and a second printing operation may be performed as illustrated in FIG. 12. That is, the first printing operation of 4 paths repeatedly performs a printing scan using 256 nozzles and a transport of the printing medium over distances corresponding to 64 nozzles on each printing area in the front side of the printing medium in the transport direction. On the other hand, the second printing operation of 8 paths repeatedly performs a printing scan using 256 nozzles and a transport of the printing medium over distances corresponding to 32 nozzles on each printing area in the remaining rear side of the printing medium in the transport direction.

Furthermore, the control procedure shown in FIG. 12 and the control procedure shown in FIG. 7 may be alternately performed depending on the type of printing medium.

The present invention has been described in detail with respect to preferred embodiments, and it will now be apparent from the foregoing to those skilled in the art that changes and modifications may be made without departing from the invention in its broadest aspect, and it is the intention, therefore, in the apparent claims to cover all such changes and modifications as fall within the true spirit of the invention.

What is claimed is:

1. A printing apparatus for printing an image on a printing medium by repeating a printing scan of a printing head having a plurality of printing elements in a main-scan direction and transporting the printing medium in a sub-scan direction perpendicular to the main-scan direction, the printing scan being a scan for performing printing by ejecting ink, said apparatus comprising:

a first printing control means for providing a complete image by performing the printing scan M times (M is an integral number: M>1) using N printing elements (N is an integral number: N>2) on the same printing area of the printing medium;

a second printing control means for providing a complete image by performing the printing scan K times (K is an integral number: K>M) using L printing elements (L is an integral number: L<N) on the same printing area of the printing medium; and a printing control switching means for allowing an image printing using said second printing control means for a first printing area including a rear end of the printing medium in the direction of transporting the printing medium and an image printing using said first printing control means for a second printing area in a front side other than the first printing area of the printing medium in the direction of transporting the printing medium.

2. The printing apparatus according to claim 1, further comprising:

a discriminating means for discriminating the first and the second printing areas of the printing medium in the direction of transporting the printing medium.

3. The printing apparatus according to claim 2, wherein said discriminating means discriminates the first and the second printing areas of the printing medium in the direction of transporting the printing on the basis of a distance from a front end of the printing medium in the direction of transporting the printing medium.

4. The printing apparatus according to claim 2, wherein said discriminating means discriminates the first and the second printing areas of the printing medium in the direction of transporting the printing on the basis of a distance from a rear end of the printing medium in the direction of transporting the printing medium.

5. The printing apparatus according to claim 2, wherein said discriminating means discriminates the first and second printing areas of the printing medium in the direction of transporting the printing medium on the basis of a transport position of the printing medium when the rear end of the printing medium, in the direction of transporting the printing medium, comes off a transport roller for transporting the printing medium.

6. The printing apparatus according to claim 1, wherein the printing element of the printing head is able to eject ink from an ink-ejecting orifice.

7. The printing apparatus according to claim 6, wherein the printing element of the printing head has an electro-thermal transducer that generates thermal energy as energy for ejecting ink from the ink-ejecting orifice.

8. The printing apparatus according to claim 1, further comprising:

a first roller transporting means for transporting the printing medium, said first roller transporting means being positioned on an upstream side of the printing medium in the direction of transporting the printing medium; and a second roller transporting means for transporting the printing medium, said second roller transporting means being positioned on a downstream side of the printing medium in the direction of transporting the printing medium, wherein a part of the first printing area is used for printing when the printing medium is transported by said second roller transporting means, and wherein the second printing area is used for printing when the printing medium is transported by both said first roller transporting means and said second roller transporting means.

9. A printing method for printing an image on a printing medium by repeating a printing scan of a printing head having a plurality of printing elements in a main-scan direction and transporting the printing medium in a sub-scan direction perpendicular to the main-scan direction, the printing scan being a scan for performing printing by ejecting ink, said method comprising the steps of:

providing a complete image by performing the printing scan M times (M is an integral number: M>1) using N printing elements (N is an integral number: N>2) on the same printing area in a second printing area in a front side other than a first printing area including a rear end of the printing medium in the direction of transporting the printing medium; and providing a complete image by performing the printing scan K times (K is an integral number: K>M) using L printing elements (L is an integral number: L<N) on the same printing area in the first printing area of the printing medium in the direction of transporting the printing medium.

10. The printing method according to claim 9, further comprising the step of:

discriminating the first and the second printing areas of the printing medium in the direction of transporting the printing medium on the basis of a distance from a front end of the printing medium in the direction of transporting the printing medium.

11. The printing method according to claim 9, further comprising the step of:
discriminating the first and the second printing areas of the printing medium in the direction of transporting the printing medium on the basis of a distance from a rear end of the printing medium in the direction of transporting the printing medium.

12. The printing method according to claim 9, further comprising the step of:
discriminating the first and the second printing areas of the printing medium in the direction of transporting the printing medium on the basis of a transport position of the printing medium when the rear end of the printing medium, in the direction of transporting the printing medium, comes off a transport roller used for transporting the printing medium.

13. A printing apparatus for printing an image on a printing medium by repeating a printing scan of a printing head having a plurality of printing elements in a main-scan direction and transporting the printing medium in a sub-scan direction perpendicular to the main-scan direction, the printing scan being a scan for performing printing by ejecting ink, said apparatus comprising:
a first printing control means for providing a complete image by performing the printing scan M times (M is an integral number: M>1) on the same printing area of the printing medium;
a second printing control means for providing a complete image by performing the printing scan K times (K is an integral number: K>M) on the same printing area of the printing medium;
a first roller and a second roller for transporting the printing medium, said first roller being positioned on an upstream side of the printing medium in the direction of transporting the printing medium, and said second roller being positioned on a downstream side of the printing medium in the direction of transporting the printing medium; and
a printing control switching means for switching from the image printing using said first printing control means to an image printing using said second printing control means depending on a transporting position of the printing medium,
wherein when the printing medium is situated at a predetermined position on an upstream side of a position for transporting the printing medium by using said second roller without using said first roller after the printing medium is transported by using said first roller and said second roller, the switching is performed by said printing control switching means.

14. A printing apparatus for printing an image on a printing medium by repeating a printing scan of a printing head having a plurality of printing elements in a main-scan direction and transporting the printing medium in a sub-scan direction perpendicular to the main-scan direction, the printing scan being a scan for performing printing by ejecting ink, said apparatus comprising:
a transport means for transporting the printing medium, using a first roller and a second roller, the first roller being positioned on an upstream side of the printing medium in the direction of transporting the printing medium, the second roller being positioned on a downstream side of the printing medium in the direction of transporting the printing medium;
a first printing means for printing an image on the printing medium by a first printing operation in which a complete image is obtained by performing a printing scan for a first predetermined number of times on the same printing area of the printing medium when the printing medium is situated at a position for transporting the printing medium using both the first roller and the second roller; and
a second printing means for printing an image on the printing medium by a second printing operation in which a complete image is obtained by performing the printing scan for a second predetermined number of times more than the first predetermined number of times on the same printing area of the printing medium;
a print control switching means for, when the printing medium is situated at a predetermined position on a upstream side of a position at which the printing medium comes off said first roller, switching from the image printing using said first printing control means to an image printing using said second printing control means.

15. A printing apparatus for printing an image on a printing medium by repeating a printing scan of a printing head having a plurality of printing elements in a main-scan direction and transporting the printing medium in a sub-scan direction perpendicular to the main-scan direction, the printing scan being a scan for performing printing by ejecting ink, said apparatus comprising:
a first printing control means for providing a complete image by performing the printing scan M times (M is an integral number: M>1) using N printing elements (N is an integral number: N>2) on the same printing area of the printing medium;
a second printing control means for providing a complete image by performing the printing scan K times (K is an integral number: K>M) using L printing elements (L is an integral number: L<N) on the same printing area of the printing medium; and
a printing control switching means for allowing an image printing using said second printing control means for a first printing area including an end of the upstream side of the printing medium in the direction of transporting the printing medium and an image printing using said first printing control means for a predetermined printing area in a second printing area on a downstream side other than the first printing area of the printing medium in the direction of transporting the printing medium.

16. The printing apparatus according to claim 15, further comprising:
a first roller transporting means for transporting the printing medium, said first roller transporting means being positioned on an upstream side of the printing medium in the direction of transporting the printing medium; and
a second roller transporting means for transporting the printing medium, said second roller transporting means being positioned on a downstream side of the printing medium in the direction of transporting the printing medium,
wherein a part of the first printing area is used for printing when the printing medium is transported by said second roller transporting means, and
wherein the second printing area is used for printing when the printing medium is transported by both said first roller transporting means and said second roller transporting means.

* * * * *